United States Patent
Inoue et al.

(10) Patent No.: US 8,551,630 B2
(45) Date of Patent: Oct. 8, 2013

(54) ELECTRIC POWER STORAGE SYSTEM

(75) Inventors: Takao Inoue, Nisshin (JP); Chikaaki Okuda, Nagoya (JP); Naoki Baba, Nagakute (JP)

(73) Assignee: Kabushiki Kaisha Toyota Chuo Kenkyusho, Toyota (JP)

(*) Notice: Subject to any disclaimer, the term of this patent is extended or adjusted under 35 U.S.C. 154(b) by 0 days.

(21) Appl. No.: 13/429,860

(22) Filed: Mar. 26, 2012

(65) Prior Publication Data
US 2012/0276424 A1 Nov. 1, 2012

(30) Foreign Application Priority Data
Apr. 28, 2011 (JP) ................................. 2011-101840

(51) Int. Cl.
*H01M 10/50* (2006.01)
(52) U.S. Cl.
USPC .............................. 429/62; 429/223; 429/246
(58) Field of Classification Search
None
See application file for complete search history.

(56) References Cited

U.S. PATENT DOCUMENTS

| 7,887,955 | B2* | 2/2011 | Saruwatari et al. | 429/246 |
| 2006/0134520 | A1* | 6/2006 | Ishii et al. | 429/223 |
| 2007/0059587 | A1* | 3/2007 | Kishi et al. | 429/62 |

FOREIGN PATENT DOCUMENTS

| JP | A-2002-141112 | 5/2002 |
| JP | A-2007-080575 | 3/2007 |

OTHER PUBLICATIONS

Feb. 26, 2013 Office Action issued in Japanese Patent Application No. 2011-101840 (with translation).

* cited by examiner

*Primary Examiner* — John S Maples
(74) *Attorney, Agent, or Firm* — Oliff & Berridge, PLC

(57) ABSTRACT

An electric power storage system 10 of the present invention includes a lithium secondary battery; a detection device to detect the temperature of the lithium secondary battery; and a control device to decrease a remaining capacity of the lithium secondary battery based on an increase of the detected temperature and a temperature Tbx of the lithium secondary battery. When a self-heating rate of the lithium secondary battery at a temperature T (K) and a remaining capacity x (%) is represented by Hs(x, T) (K/min), and a heat dissipation rate at a temperature T (K) of the lithium secondary battery is represented by Hd(T) (K/min), the temperature Tbx is a temperature at which Hs(x,Tbx)>Hd(Tbx) holds. That is, this temperature Tbx is a temperature at which the heat generating rate is higher than the heat dissipation rate and at which the battery temperature T starts to increase.

8 Claims, 2 Drawing Sheets

ELECTRIC POWER STORAGE SYSTEM

CROSS REFERENCE TO RELATED APPLICATIONS

This application claims priority to Japanese Patent Application No. 2011-101840 filed on Apr. 28, 2011, the entire contents of which are incorporated by reference herein.

BACKGROUND OF THE INVENTION

1. Field of the Invention

The present invention relates to an electric power storage system.

2. Description of the Related Art

Heretofore, as an electric power storage system, there has been proposed a system including a nonaqueous electrolyte battery which has a nonaqueous electrolyte containing an ordinary temperature molten salt, a negative electrode, and a positive electrode, a temperature detection unit to detect an environmental temperature of the nonaqueous electrolyte battery, a control unit to decrease the maximum battery voltage of the nonaqueous electrolyte battery concomitant with an increase of the environmental temperature, and a control unit to control the maximum charge amount of the nonaqueous electrolyte battery to a constant value (for example, see Patent Document 1). In this electric power storage system, cycle characteristics of the nonaqueous electrolyte battery using an ordinary temperature molten salt can be improved under high temperature environment.

Patent Document 1: JP 2007-80575 A

SUMMARY OF THE INVENTION

In the above Patent Document 1, when the temperature exceeds 60° C. in the case of using an ordinary temperature molten salt, the cycle characteristics may be degraded in some cases due to a decrease in viscosity and/or an increase in dissociation strength of ions, and in a lithium secondary battery using an organic solvent-based electrolyte, it has been indicated that the battery can only be used up to approximately 60° C., for example, due to evaporation of the solvent. In the electric power storage system disclosed in Patent Document 1, although a high-temperature cycle characteristics at a temperature of 80° C. or less has been studied, the cycle characteristics at a temperature higher than 80° C. has not been studied. In the case in which the temperature is increased to more than 80° C., for example, the battery is commonly cooled using a cooling mechanism, such as a cooling fan. As described above, in view of safety and efficiency, it has been desired that a lithium ion secondary battery or the like be used in a more appropriate range in accordance with the change in temperature.

The present invention was made in consideration of the problems as described above, and an object of the present invention is to provide an electric power storage system which can be used in a more appropriate range in accordance with the change in temperature.

Through intensive research in order to achieve the above object, the inventors discovered that, by clarifying the relationship between an environmental temperature of a battery and a remaining capacity (state of charge, SOC) thereof, the battery can be used in a more appropriate range in accordance with the change in temperature even at a high temperature of, for example, 100° C. or more, and hence the present invention was made.

That is, an electric power storage system of the present invention comprises: a lithium secondary battery including a positive electrode which has a positive electrode active material containing a metal oxide, a negative electrode containing a negative electrode active material, and an ion conductive medium which is provided between the positive electrode and the negative electrode and which conducts lithium ions; a detection unit to detect a temperature T of the lithium secondary battery; and a control unit to decrease a remaining capacity of the lithium secondary battery based on a temperature Tbx (K) when the detected temperature T increases, the temperature Tbx (K) being a temperature of the lithium secondary battery at which $Hs(x,Tbx) > Hd(Tbx)$ holds, where $Hs(x,T)$ (K/min) indicates a self-heating rate of the lithium secondary battery at a temperature T (K) and a remaining capacity x (%), and $Hd(T)$ (K/min) indicates a heat dissipation rate of the lithium secondary battery at the temperature T (K).

The present invention can provide an electric power storage system to be used in a more appropriate range in accordance with the change in temperature. The reason the effect as described above is obtained is considered as follows. For example, it is considered that the stability of the lithium secondary battery to heat is greatly dependent on a charge state. That is, it is considered that for example, in a high temperature range of 100° C. or more, when the remaining capacity of the lithium secondary battery is adjusted, the lithium secondary battery can be used in a stable state, and the quality thereof can be more preferably maintained.

DESCRIPTION OF THE PREFERRED EMBODIMENTS

Figure 1:
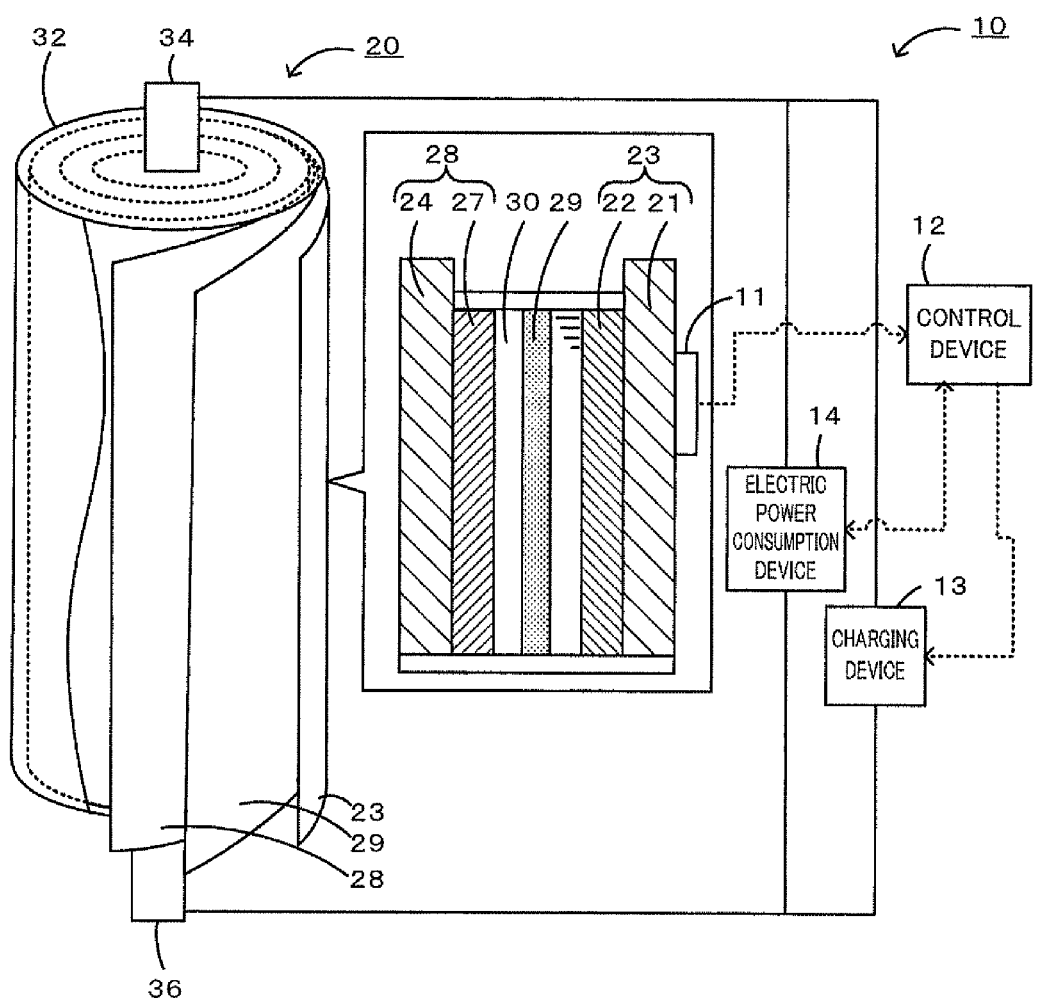
FIG. 1 is a schematic view showing the structure of an electric power storage system 10 of the present invention.

An electric power storage system of the present invention includes: a lithium secondary battery having a positive electrode which has a positive electrode active material containing a metal oxide, a negative electrode containing a negative electrode active material, and an ion conductive medium which is provided between the positive electrode and the negative electrode and which conducts lithium ions; a detection device to detect the temperature of the lithium secondary battery; and a control device to decrease a remaining capacity SOC (state of charge) of the lithium secondary battery based on an increase of a detected temperature and a temperature Tbx of the lithium secondary battery. The temperature Tbx is defined as a temperature that satisfies $Hs(x,Tbx) > Hd(Tbx)$ in Which $Hs(x,T)$ (K/min) indicates a self-heating rate of the lithium secondary battery at a temperature T (K) and a remaining capacity x (%), and $Hd(T)$ (K/min) indicates a heat dissipation rate of the lithium secondary battery at the temperature T (K). That is, at the temperature Tbx, the heating rate is higher than the heat dissipation rate, and the battery temperature T starts to increase. FIG. 1 is a schematic view showing the structure of an electric power storage system 10 of the present invention. As shown in FIG. 1, the electric power storage system 10 includes a lithium secondary battery 20, a detection device 11 to detect the temperature of the lithium secondary battery 20, a control device 12 to decrease the remaining capacity of the lithium secondary battery 20, a charging device 13 to charge the lithium secondary battery 20, and an electric power consumption device 14 which is operated by an electric power supplied from the lithium secondary battery 20.

The positive electrode of the lithium secondary battery of the present invention is formed, for example, by the steps of mixing a positive electrode active material, a conductive material, and a binder, adding an appropriate solvent to this mixture to form a positive electrode material in the form of a paste, and then applying this paste on at least one surface of a collector, followed by drying, and if necessary, in order to increase an electrode density, a compression step may be further performed. As the positive electrode active material, for example, a metal oxide containing lithium and a transition metal element may be used. In particular, for example, lithium manganese composite oxides, such as $Li_{(1-x)}MnO_2$ (such as $0<x<1$, hereinafter, x is in the same range) and $Li_{(1-x)}Mn_2O_4$, lithium cobalt composite oxides, such as $Li_{(1-x)}CoO_2$, lithium nickel composite oxides, such as $Li_{(1-x)}NiO_2$, lithium vanadium composite oxides, such as $LiV_2O_3$, and transition metal oxides, such as $V_2O_5$, may be used. This metal oxide preferably contains Ni as a primary component. In this case, the primary component indicates a primary composition. For example, in the case of a binary compound, such as $Li(Ni,Co)O_2$, an element which occupies 50% or more of contained transition metals is regarded as a primary component, and in the case of a tertiary compound, such as $Li(Ni,Co,Mn)O_2$, an element which occupies ⅓ or more of contained transition metals is regarded as a primary component. In a transition metal composite oxide containing Ni as a primary component, since the chemical stability is strongly depends on the temperature and a Li occlusion amount (state of charge), the application of the present invention is significantly meaningful.

The conductive material contained in the positive electrode is not particularly limited as long as having no adverse influences on battery performance of the positive electrode, and for example, graphites, such as natural graphite (vein graphite and flake graphite) and artificial graphite, acetylene black, carbon black, Ketjen black, carbon whiskers, needle coke, carbon fibers, and the like may be used alone or in combination in the form of a mixture. Among those mentioned above, carbon black and acetylene black are more preferable as the conductive material in view of electron conductivity and coating properties. The binder functions to bind active material grains and conductive material grains, and for example, fluorine resins, such as a polytetrafluoroethylene (PTFE), a polyvinylidene fluoride (PVDF), and a fluorine rubber; thermoplastics, such as a polypropylene and a polyethylene; an ethylene-propylene-diene terpolymer (EPDM), a sulfonated EPDM, a natural butyl rubber (NBR) may be used alone or in combination in the form of a mixture. In addition, for example, a cellulose compound functioning as a water-based binder and a water dispersion of a styrene butadiene rubber (SBR) may also be used. As a solvent dispersing the positive electrode active material, the conductive material, and the binder, for example, organic solvents, such as N-methyl pyrrolidone, dimethylformamide, dimethylacetamide, methyl ethyl ketone, cyclohexanone, methyl acetate, methyl acrylate, diethyltriamine, N,N-dimethylaminopropylamine, ethylene oxide, and tetrahydrofuran, may be used. In addition, by addition of a dispersant, a thickener, or the like to water, the active material may be formed into a slurry using a latex of SBR or the like. As the thickener, for example, polysaccharides, such as carboxymethylcellulose and methylcellulose, may be used alone or in combination in the form of a mixture. As a coating method, for example, roller coating using an applicator roll or the like, screen coating, a doctor blade method, spin coating, and bar coater may be mentioned, and by using one of these mentioned above, a film having an arbitrary thickness and shape may be formed. As the collector, besides aluminum, titanium, stainless steel, nickel, iron, baked carbon, a conductive polymer, a conductive glass, and the like, in order to improve the adhesive property, the electric conductivity, and the oxidation resistance, a member obtained by processing the surface of aluminum, copper, or the like, for example, with carbon, nickel, titanium, or silver may also be used. An oxidation treatment may also be performed on the surfaces of those mentioned above. As the shape of the collector, for example, a foil form, a film form, a sheet form, a net form, a punched or expanded form, a lath form, a porous form, a foam form, a molded form of fibers may be mentioned. As the collector, for example, a film having a thickness of 1 to 500 μm may be used.

The negative electrode of the lithium secondary battery of the present invention may be formed from a lithium metal or a lithium alloy. In addition, the negative electrode of the lithium secondary battery of the present invention is formed, for example, by the steps of mixing a negative electrode active material, a conductive material, and a binder, adding an appropriate solvent to this mixture to form a negative electrode material in the form of a paste, and applying this paste on at least one surface of a collector, followed by drying, and if necessary, in order to increase an electrode density, a compression step may be further performed. Although a carbon material, a conductive polymer, and the like, each of which can occlude and release lithium ions, may be mentioned as the negative electrode active material, among those mentioned above, a carbon material is preferable in view of safety. Although this carbon material is not particularly limited, for example, corks, glassy carbons, graphites, non-graphitizable carbons, pyrolytic carbons, and carbon fibers may be mentioned. Among those mentioned above, graphites, such as artificial graphite and natural graphite, are preferable since having an operating potential similar to that of a metal lithium, being capable of performing charge and discharge at a high operating voltage, suppressing self-discharge when a lithium salt is used as an electrolyte salt, and being capable of decreasing an irreversible capacity at the time of charge. In addition, as the conductive material, the binder, the solvent, and the like used for the negative electrode, the respective compounds described for the positive electrode by way of example may also be used. Besides copper, nickel, stainless steel, titanium, aluminum, baked carbon, a conductive polymer, a conductive glass, an Al—Cd alloy, and the like, in order to improve the adhesive property, the electric conductivity, and the reduction resistance, a member obtained by processing the surface of copper or the like with carbon, nickel, titanium, silver, or the like may also be used. An oxidation treatment may also be performed on the surfaces of those mentioned above. As the shape of the collector, shapes similar to those described for the positive electrode may be used.

As the ion conductive medium of the lithium secondary battery of the present invention, for example, a nonaqueous electrolyte or a nonaqueous gel electrolyte, each containing a supporting salt, may be used. As a solvent of the nonaqueous electrolyte, for example, carbonates, esters, ethers, nitriles, furans, sulfolanes, and dioxolanes may be mentioned, and those mentioned above may be used alone or in combination in the form of a mixture. In particular, for example, carbonates including cyclic carbonates, such as ethylene carbonate, propylene carbonate, vinylene carbonate, butylene carbonate, and chloroethylene carbonate, and chain carbonates, such as dimethyl carbonate, ethyl methyl carbonate, diethyl carbonate, ethyl-n-butyl carbonate, methyl-t-butyl carbonate, di-i-propyl carbonate, and t-butyl-i-propyl carbonate; cyclic esters, such as γ-butyrolactone and γ-valerolactone; chain esters, such as methyl formate, methyl acetate, ethyl acetate, and methyl butyrate; ethers, such as dimethoxyethane, ethoxymethoxyethane and diethoxyethane; nitriles, such as acetonitrile and benzonitrile; furans, such as tetrahydrofuran and methyltetrahydrofuran; sulfolanes, such as sulfolane and tetramethyl sulfolane; and dioxolanes, such as 1,3-dioxolane and methyl dioxolane, may be mentioned. Among those mentioned above, a combination between a cyclic carbonate and a chain carbonate is preferable. According to the combination described above, cycle characteristics showing the battery performance by repetition of charge and discharge is not only excellent, but also the viscosity of the electrolyte, the capacity of an obtained battery, the battery output, and the like can be well combined with each other. In addition, the reason for this is believed that a cyclic carbonate has a comparatively high relative dielectric constant and increases the dielectric constant of the electrolyte and that a chain carbonate suppresses an increase in viscosity of the electrolyte.

As the supporting salt contained in the lithium secondary battery of the present invention, for example, $LiPF_6$, $LiBF_4$, $LiAsF_6$, $LiCF_3SO_3$, $LiN(CF_3SO_2)$ $LiC(CF_3SO_2)_3$, $LiSbF_6$, $LiSiF_6$, $LiAlF_4$, $LiSCN$, $LiClO_4$, $LiCl$, $LiF$, $LiBr$, $LiI$, and $LiAlCl_4$ may be mentioned. Among those mentioned above, in view of electric properties, inorganic salts, such as $LiPF_6$, $LiBF_4$, $LiAsF_6$, and $LiClO_4$, and organic salts, such as $LiCF_3SO_3$, $LiN(CF_3SO_2)_2$, and $LiC(CF_3SO_2)_3$ are preferably used alone or in combination. This electrolyte salt preferably has a concentration in a range of 0.1 to 5 mol/L in the nonaqueous electrolyte and more preferably in a range of 0.5 to 2 mol/L. When the concentration of the electrolyte salt is 0.1 mol/L or more, a sufficient current density can be obtained, and when the concentration is 5 mol/L or less, the electrolyte can be further stabilized. In addition, for example, a phosphorus-based and/or a halogen-based flame retardant may also be added to this nonaqueous electrolyte.

In addition, a solid ion conductive polymer may also be used as the ion conductive medium instead of using a liquid ion conductive medium. As the ion conductive polymer, for example, a polymer gel including a supporting salt and a polymer formed from a monomer, such as acrylonitrile, ethylene oxide, propylene oxide, methyl methacrylate, vinyl acetate, vinyl pyrrolidone, or vinylidene fluoride may be used. Furthermore, an ion conductive polymer and a nonaqueous electrolyte may also be used in combination. In addition, as the ion conductive medium, besides the ion conductive polymer, for example, an inorganic solid electrolyte, a mixed material of an inorganic solid electrolyte and an organic polymer electrolyte, or an inorganic solid powder bound by an organic binder may also be used.

The lithium secondary battery of the present invention may include at least one separator between the negative electrode and the positive electrode. Although the separator is not particularly limited as long as having a composition usable under working conditions of the lithium secondary battery, for example, polymer nonwoven cloths, such as a polypropylene nonwoven cloth and a polyphenylene sulfide nonwoven cloth, and thin microporous films of olefin resins, such as a polyethylene and a polypropylene, may be mentioned. These mentioned above may be used alone or in combination. For this separator, a stable material is preferably used so that, for example, a so-called shut-down phenomenon does not occur even at a temperature of 200° C. or more.

Although the shape of the lithium secondary battery of the present invention is not particularly limited, for example, a coin, a button, a sheet, a laminate, a cylindrical, a flat, and a square shape may be mentioned. In addition, the present invention may also be applied to a large battery used for an electric car and the like. As shown in FIG. 1, this lithium secondary battery 20 includes a positive electrode sheet 23 formed of a positive electrode collector 21 and a positive electrode mixed material layer 22 provided thereon and containing a positive electrode active material, a negative electrode sheet 28 formed of a negative electrode collector 24 and a negative electrode mixed material layer 27 provided thereon and containing a negative electrode active material, a separator 29 provided between the positive electrode sheet 23 and the negative electrode sheet 28, and a nonaqueous electrolyte 30 filled between the positive electrode sheet 23 and the negative electrode sheet 28. This lithium secondary battery 20 is formed such that after the separator 29 is provided between the positive electrode sheet 23 and the negative electrode sheet 28, these components are wound and are then inserted into a cylindrical case 32, and a positive electrode terminal 34 connected to the positive electrode sheet 23 and a negative electrode terminal 36 connected to the negative electrode sheet 28 are arranged. In addition, the positive electrode sheet 23 has the positive electrode collector 21 of Al and the positive electrode active material of a metal oxide containing Ni as a primary component. In addition, the negative electrode sheet 28 has the negative electrode collector 24 of Cu and the negative electrode active material containing a carbon material.

In the electric power storage system 10 of the present invention, the detection device 11 is a temperature sensor which detects the temperature of the lithium secondary battery 20. This detection device 11 may directly measure the lithium secondary battery 20, may estimate the temperature of the lithium secondary battery 20 using a measured temperature obtained by measuring an environmental temperature of the lithium secondary battery 20, or may regard the measured temperature as the temperature of the lithium secondary battery 20.

In the electric power storage system 10 of the present invention, the control device 12 is formed as a microprocessor incorporating a CPU as a central unit and includes besides the CPU, a ROM which stores a processing program, a RAM which temporarily stores data, and input/output ports and a communication port. This control device 12 is responsible for controlling the whole electric power storage system 10, and for example, the control device 12 inputs a detection signal from the detection device 11, outputs, for example, a control signal to the electric power consumption device 14 and a control signal to the charging device 13, and/or sets a target value of the remaining capacity of the lithium secondary battery 20. When the detected temperature T is increased, this control device 12 performs processing to decrease the remaining capacity of the lithium secondary battery 20 based on the temperature Tbx.

The charging device 13 is a device which charges the lithium secondary battery 20, and for example, a charging motor for charging a running vehicle or a fuel battery may be used. The electric power consumption device 14 is a device which is operated by an electric power supplied from the lithium secondary battery 20, and for example, in the case of a running vehicle, a drive motor may be used. The control device 12 charges an electric power consumed by the electric power consumption device 14 using the charging device 13 and controls the remaining capacity in a predetermined range.

Next, the control of the electric power storage system 10 formed as described above will be described. In the electric power storage system 10 of the present invention, when the detected temperature T is increased, the control device 12 performs processing to decrease the remaining capacity of the lithium secondary battery 20 based on the temperature Tbx. In the lithium secondary battery 20, for example, when a positive electrode active material containing Ni as a primary component is used, the chemical stability of the positive electrode active material is greatly dependent on the state of charge (SOC). In this case, for example, when the battery temperature T is increased to 100° C. or more or to 140° C. or more, the remaining capacity is decreased, so that the thermal stability of the battery is further improved. Therefore, by adjustment of the remaining capacity, the performance of the lithium secondary battery 20 can be maintained, and the lithium secondary battery can be used in a more appropriate range in accordance with the change in temperature.

The control device 12 may perform control to decrease the remaining capacity of the lithium secondary battery 20 when the temperature T detected by the detection device 11 is 373K or more. By decreasing the remaining capacity, the performance of the lithium secondary battery 20 can be maintainable even at a high temperature of 373K or more.

Figure 2:
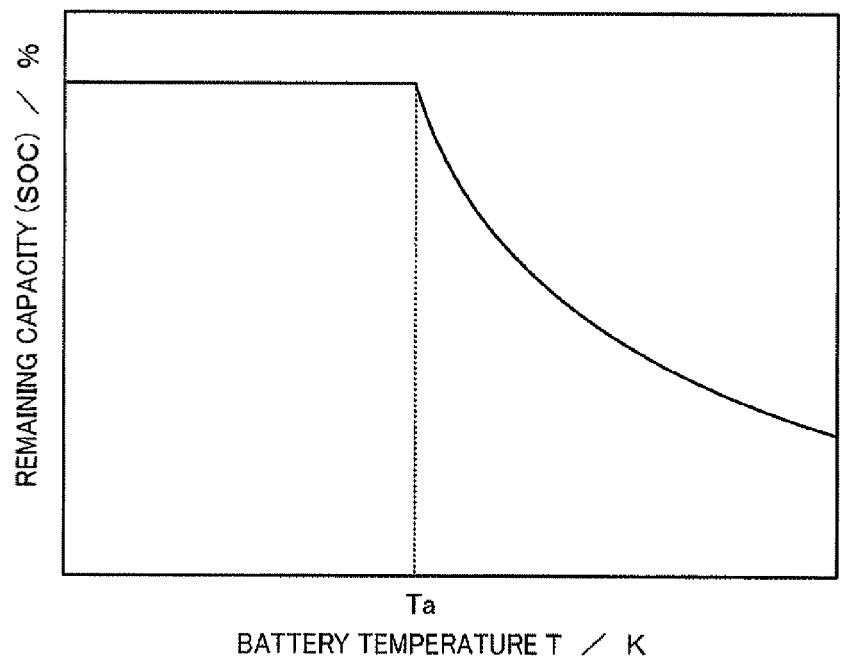
FIG. 2 is a graph showing one example of information of restriction relationship between a battery temperature T and a remaining capacity.

In the electric power storage system 10 of the present invention, the control device 12 has information of restriction relationship between the remaining capacity of the lithium secondary battery and the temperature Tbx thereof, and after the remaining capacity corresponding to the temperature Tbx which corresponds to the detected temperature T of the lithium secondary battery is obtained using the information of restriction relationship, the control device 12 may control to decrease the remaining capacity of the lithium secondary battery 20 in accordance with an increase of the detected temperature. FIG. 2 is a graph illustrating one example of the information of restriction relationship between the remaining capacity and the battery temperature T. As shown in FIG. 2, the relationship between the remaining capacity and the temperature Tbx is experimentally obtained beforehand. In this case, a highest possible remaining capacity corresponds to a predetermined battery temperature Ta or less, and when the temperature is more than this predetermined battery temperature Ta, a correspondence relationship is defined in which the remaining capacity is gradually decreased. In addition, when the battery temperature T is obtained, the control device 12 sets the remaining capacity so as to correspond thereto using the information of restriction relationship and controls charge and discharge of the lithium secondary battery 20 at the remaining capacity thus set. Accordingly, the remaining capacity can be comparatively easily decreased.

Figure 3:
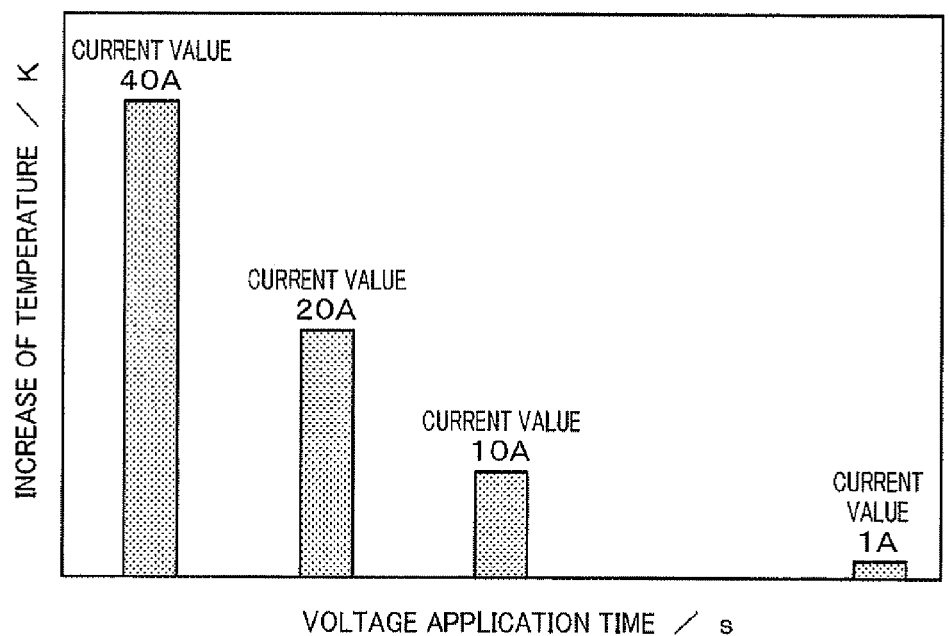
FIG. 3 is a graph showing one example of information of temperature increase relationship among a current value, a voltage application time, and an increase of temperature.

In the electric power storage system 10 of the present invention, the control device 12 has information of temperature increase relationship among a current value I (mA), a voltage application time t (s), and an increase of temperature (K) of the lithium secondary battery 20 and may control using this information of temperature increase relationship to decrease the remaining capacity of the lithium secondary battery 20 in accordance with an increase of the detected temperature T by a current value and a voltage application time within a range in which the temperature is not more than the temperature Tbx. FIG. 3 is a graph illustrating one example of the information of temperature increase relationship among the current value, the voltage application time, and the increase of temperature. Since a large amount of current is passed when the remaining capacity is decreased, Joule heat is generated. In the range in which the battery temperature T does not exceed the temperature Tbx by this increase of temperature, the charge and discharge control of the lithium secondary battery 20 is performed. For example, the case is assumed in which when the remaining capacity x is 100%, the temperature Tbx is 140° C., when a remaining capacity z is 80%, a temperature Tbz is 180° C., and when the present remaining capacity is 100%, the battery temperature T reaches 140° C. Since the temperature is remarkably increased in the above state, the control device 12 decreases the remaining capacity to 80%. In this case, since a temperature increase of Tbz−Tbx of 40° C. (=180° C.−140° C.) is permitted, by using the information of temperature increase relationship, the current value I and the voltage application time t are set within a permissible range of increase of temperature, and by performing the control using these values, the remaining capacity is decreased. Accordingly, the performance of the lithium secondary battery can be used in a more appropriate range in accordance with the change in temperature.

In the electric power storage system 10 of the present invention, when the self-heating rate of the lithium secondary battery 20 at a temperature T (K) and a remaining capacity x (%) is represented by Hs(x,T) (K/min), and the heat dissipation rate of the lithium secondary battery 20 at a temperature T (K) is represented by Hd(T) (K/min), a temperature of the lithium secondary battery at which Hs(x,Tbx)>Hd(Tbx) holds is represented by Tbx (K). In this case, the control device 12 may be configured to decrease the remaining capacity of the lithium secondary battery to a remaining capacity z (%) associated with the temperature Tbx so that Hs(z,Tbx)<Hd(Tbx) holes. By the adjustment of the remaining capacity as described above, the performance of the lithium secondary battery 20 can also be maintained, and the lithium secondary battery can be used in a more appropriate range in accordance with the change in temperature.

In the electric power storage system 10 of the present invention, when a temperature of the lithium secondary battery 20 at the remaining capacity z at which Hs(z,Tbz)>Hd(Tbz) holds is represented by Tbz (K), and when an IV resistance of the lithium secondary battery 20 is represented by R (mΩ), a current value is represented by I (mA), a voltage application time from the remaining capacity x to the remaining capacity z is represented by t (s), and a heat capacity of members other than a power generation element of the battery is represented by C (J/K), the control device 12 may perform control using a current value I and a voltage application time t, which satisfy $Tbz-Tbx > (R/1000) \times (I/1000)^2 \times t/C$. In this case, "$(R/1000) \times (I/1000)^2 \times t/C$" corresponds to an increase of temperature when the remaining capacity is decreased by the current I (ma) and the voltage application time t (s). Since the remaining capacity is decreased by controlling the current value I and the voltage application time t within the permissible range of the increase of temperature, the performance of the lithium secondary battery 20 can be more reliably maintained, and the lithium secondary battery can be used in a more appropriate range in accordance with the change in temperature.

In the electric power storage system 10 of the present invention, the positive electrode has a collector of Al and a positive electrode active material provided on two surfaces of the collector, and the negative electrode has a collector of Cu and a negative electrode active material of a carbon material provided on two surface of the collector. When the amount of the positive electrode mixed material per one surface is represented by Pam (mg/cm$^2$), the two-sided thickness of the positive electrode mixed material is represented by Pat (μm), the thickness of the positive electrode collector is represented by Pct (μm), the amount of the negative electrode mixed material per one surface is represented by Nam (mg/cm$^2$), the two-sided thickness of the negative electrode mixed material is represented by Nat (μm), and the thickness of the negative electrode collector is represented by Nat (μm), in a range represented by $100<388.5\times Pam\times Pat/Pct^2<1000$ and $30<13.7\times Nam\times Nat/Nct^2 1000$, the remaining capacity may be adjusted within at least 10 minutes after the temperature reaches the temperature Tbx. In the positive electrode, $388.5\times Pam\times Pat/Pct^2$ is represented by a coefficient P, and in the negative electrode, $13.7\times Nam\times Nat/Nct^2$ is represented by a coefficient N. The coefficient P is a conceptual index indicating a heat conduction rate per 1 cm$^2$ of the positive electrode layer (metal oxide layer functioning as a primary component) with respect to a heat conduction rate per 1 cm$^2$ of the positive electrode collector (Al foil in this case). In addition, the coefficient N is a conceptual index indicating a heat conduction rate per 1 cm$^2$ of the negative electrode layer (carbon layer functioning as a primary component) with respect to a heat conduction rate per 1 cm$^2$ of the negative electrode collector (Cu foil in this case). It is believed that as the coefficient P and the coefficient N are increased, the ratio of the electrode layer having a low heat conductivity is increased as compared to that of the collector having a high heat conductivity, and as a result, heat is not likely to be conducted. Therefore, when these coefficients P and S are in the above respective ranges, it is indicated that there is a margin of approximately 10 minutes to decrease the remaining capacity. Hence, for example, the current value I and the voltage application time t which are used to decrease the remaining capacity can be set in accordance with this marginal time. As described above, the performance of the lithium secondary battery 20 can also be more reliably maintained, and the lithium secondary battery can be used in a more appropriate range in accordance with the change in temperature.

In the electric power storage system 10 of the present invention, the temperature Tbx may be determined based on an initial exothermic onset temperature obtained by a differential scanning calorimetry (DSC) using a positive electrode obtained after the remaining capacity is adjusted. Although the self-heating rate Hs(x,T) (K/min) and the heat dissipation rate Hd(T) (K/min) are difficult to measure, the temperature Tbx can be comparatively easily obtained by the method described above.

In the electric power storage system 10 of this embodiment described above in detail, when the battery temperature T is increased, the performance of the lithium secondary battery 20 can be maintained by controlling to decrease the remaining capacity using the relationship between the remaining capacity and the temperature Tbx (K) of the lithium secondary battery at which the formula, self-heating rate Hs(x,Tbx)> heat dissipation rate Hd(Tbx), holds. In addition, when a temperature at which Hs(z,Tbz)>Hd(Tbz) holds at a target remaining capacity z (%) to be decreased is represented by Tbz (K), since the control is performed by a current value I and a voltage application time t which satisfy Tbz−Tbx> $(R/1000)\times(I/1000)^2\times t/C$, the performance of the lithium secondary battery can be maintained. Furthermore, when 100<coefficient P<1000 and 30<coefficient N<1000 both hold, since the control is performed to adjust the remaining capacity within at least 10 minutes after the temperature reaches the temperature Tbx, the performance of the lithium secondary battery 20 can be maintained. In addition, the positive electrode collector is formed of Al foil, the negative electrode collector is formed of Cu foil, the coefficient P is represented by $388.5\times Pam\times Pat/Pct^2$, and the coefficient N is represented by $13.7\times Nam\times Nat/Nct^2$. By performing the control described above, the lithium secondary battery can be used in a more appropriate range in accordance with the change in temperature.

In addition, the present invention is not limited to the embodiments described above and may be variously performed without departing from the technical scope of the present invention.

EXAMPLES

Hereinafter, the lithium secondary battery of the present invention is formed in particular, and an example in which the relationship between the remaining capacity and the temperature is obtained will be described as an experimental example.

Formation of Lithium Secondary Battery

Nickel acid lithium ($LiNi_{0.8}Co_{0.15}Al_{0.05}O_2$) in an amount of 85 parts by mass as a positive electrode active material, 10 parts by mass of carbon black (TB5500 manufactured by Tokai Carbon Co., Ltd.) as a conductive material, 5 parts by mass of a polyvinylidene fluoride (KF polymer manufactured by Kureha Chemical Industry Co., Ltd.) as a binder, and an appropriate amount of N-methyl-2-pyrrolidone (NMP) as a dispersant were added to and mixed with each other, so that a positive electrode mixed material in the form of a paste was formed. This positive electrode mixed material was uniformly applied to two surfaces of an aluminum foil collector having a thickness of 20 μm and was then dried. Subsequently, the density of the above composite was increased by a roll press, so that a positive electrode in the form of a sheet was obtained. This positive electrode was formed of the positive electrode collector and positive electrode mixed material layers formed on the surfaces thereof. The positive electrode in the form of a sheet thus prepared was cut into a size having a width of 54 mm and a length of 450 mm, so that a positive electrode for a nonaqueous electrolyte lithium secondary battery of Experimental Example 1 was prepared. Next, 95 parts by mass of artificial graphite as a negative electrode active material, 5 parts by mass of a polyvinylidene fluoride as a binder, and an appropriate amount of NMP as a dispersant were added to and dispersed with each other, so that a negative electrode mixed material in the form of a slurry was formed. This negative electrode mixed material was uniformly applied to two surfaces of a copper foil collector having a thickness of 10 μm and was then dried. Subsequently, the density of the above composite was increased by a roll press, so that a negative electrode in the form of a sheet was obtained. This negative electrode was formed of the negative electrode collector and negative electrode mixed material layers formed on the surfaces thereof. The negative electrode in the form of a sheet thus prepared was cut into a size having a width of 56 mm and a length of 500 mm, so that a negative electrode for the nonaqueous electrolyte lithium secondary battery of Experimental Example 1 was prepared. As an electrolyte, a solution (manufactured by Kishida Yakuhin K.K.) prepared by dissolving 1M of $LiPF_6$ in a nonaqueous solvent containing ethylene carbonate (EC) and diethyl carbonate (DEC) at a volume ratio of 3:7 was used. The positive electrode sheet and the negative electrode sheet thus formed were wound around to form a roll shape with separators, each of which is formed of a polyethylene having a width of 58 mm and a thickness of 25 mm, provided therebetween and were accommodated in a 18650 type cylindrical battery case. At this time, a positive electrode collector lead was connected to a positive electrode collector tab arranged at a cap side of the battery case by welding, and a negative electrode collector lead was connected to a negative electrode collector tab arranged at the bottom of the battery case by welding. After an electrolyte was charged into this battery case, a top cap was caulked for sealing, so that a cylindrical lithium secondary battery was formed.

Charge and Discharge Test

A battery capacity at 20° C. was measured using the nonaqueous electrolyte lithium secondary battery thus obtained. The battery was maintained at 20° C., and one charge discharge cycle was performed in which charge was first performed to a charge maximum voltage of 4.1 V by a constant current at a current density of 0.5 mA/cm$^2$ and discharge was then performed to a discharge minimum voltage of 3.0 V by a constant current at a current density of 0.2 mA/cm$^2$, so that a discharge capacity (mAh/g) was obtained.

IV Resistance Measurement

By using the battery thus formed, after the battery was discharged and adjusted so that the remaining capacity SOC was 50%, currents of 0.5 A, 1 A, 2 A, 3 A, and 5 A were each supplied to the battery, and the battery voltage was obtained 10 seconds after the current supply. After the currents thus supplied and the voltages were plotted, points thus obtained were linear-approximated, and the IV resistance (mΩ) was obtained from its slope.

Battery Heating Test

The battery thus obtained was placed in an oven, and a heating test was performed. The temperature of the oven was increased at 5° C./min and was maintained at a predetermined temperature till the end of the test. The battery voltage was measured 2 hours after the start of the test, and the result was evaluated as "Good" or "No Good" depending on whether the voltage was 3 V or more or less than 3 V, respectively.

Calculation of Heat Capacity C of Members Other Than Power Generation Element

Primary materials of members other than the power generation element of the nonaqueous electrolyte lithium secondary battery thus formed are shown in Table 1 together with the content, the specific heat capacity, and the heat capacity of each of the above members. As shown in Table 1, the members other than the power generation element are the positive electrode terminal, the battery can, the positive electrode collector, the negative electrode collector, and the like, and the heat capacity C was estimated to be 27 J/K.

TABLE 1

|  | PRIMARY MATERIAL | CONTENT g | SPECIFIC HEAT CAPACITY J/(g · K) | HEAT CAPACITY J/K |
|---|---|---|---|---|
| POSITIVE ELECTRODE TERMINAL | Al | 0.85 | 0.90 | 20.66 |
| BATTERY CAN | Fe | 8.8 | 0.45 | 3.95 |
| POSITIVE ELECTRODE COLLECTOR | Al | 1.5 | 0.90 | 1.36 |
| NEGATIVE ELECTRODE COLLECTOR | Cu | 2.5 | 0.39 | 0.97 |

Calculation of Coefficients P and N

The coefficient relating to the heat conduction of each electrode was calculated. The constants and the like used for calculation are shown in Table 2. As for the positive electrode, when the amount of the positive electrode mixed material per one surface is represented by Pam (mg/cm$^2$), the two-sided thickness of the positive electrode mixed material is represented by Pat (μm), and the thickness of the positive electrode collector is represented by Pct (μm), the coefficient P can be represented by $388.5 \times Pam \times Pat/Pct^2$. In addition, as for the negative electrode, when the amount of the negative electrode mixed material per one surface is represented by Nam (mg/cm$^2$), the two-sided thickness of the negative electrode mixed material is represented by Nat (μm), and the thickness of the negative electrode collector is represented by Nct (μm), the coefficient N can be represented by $13.7 \times Nam \times Nat/Nct^2$. The coefficient P is a conceptual index indicating a heat conduction rate per 1 cm$^2$ of the positive electrode layer (metal oxide layer functioning as a primary component) with respect to a heat conduction rate per 1 cm$^2$ of the positive electrode collector (Al foil in this case). In addition, the coefficient N is a conceptual index indicating a heat conduction rate per 1 cm$^2$ of the negative electrode layer (carbon layer functioning as a primary component) with respect to a heat conduction rate per 1 cm$^2$ of the negative electrode collector (Cu foil in this case). It is believed that as the coefficient P and the coefficient N are increased, the ratio of the electrode layer having a low heat conductivity is increased as compared to that of the collector having a high heat conductivity, and as a result, heat is not likely to be conducted.

TABLE 2

|  | Al | OXIDES | Cu | CARBON |
|---|---|---|---|---|
| HEAT CONDUCTIVITY (W/(m · K)) | 236 | 5 | 400 | 120 |
| DENSITY (g/cm$^3$) | 2.7 | Pam | 8.87 | Nam |
| SPECIFIC HEAT CAPACITY (J/(g · K)) | 0.9 | 1.0 | 0.39 | 0.71 |
| MASS (g/cm$^2$)[1] | $Pct*2.7*10^{-4}$ | $2Pam*10^{-3}$ | $Nct*8.87*10^{-4}$ | $2Nam*10^{-3}$ |
| HEAT CONDUCTION COEFFICIENT (W/(K · cm$^2$)) | $236/Pct*10^2$ | $5/Pat*10^{-2}$ | $400/Nct*10^2$ | $120/Nat*10^{-2}$ |
| HEAT CAPACITY (J/(K · cm$^2$))[1] | $Pct*2.7*0.9*10^{-4}$ | $Pam*2*1.0*10^{-3}$ | $Pct*8.87*0.39*10^{-4}$ | $Nam*2*0.71*10^{-3}$ |
| HEAT CONDUCTION RATE (s) | $Pct^2*1.03*10^{-8}$ | $Pam*Pat*4*10^{-8}$ | $Nct^2*8.65*10^{-9}$ | $Nam*Nat*1.18*10^{-6}$ |
| COEFFICIENT | $P = 388.5 \times Pam \times Pat/Pct^2$ | | $N = 13.7 \times Nam \times Nat/Nct^2$ | |

[1]VALUE PER UNIT AREA
※Pam: POSITIVE ELECTRODE MIXED MATERIAL PER ONE SURFACE
Pat: TWO-SIDED THICKNESS OF POSITIVE ELECTRODE MIXED MATERIAL
Pct: THICKNESS OF POSITIVE ELECTRODE COLLECTOR
Nam: NEGATIVE ELECTRODE MIXED MATERIAL PER ONE SURFACE
Nat: TWO-SIDED THICKNESS OF NEGATIVE ELECTRODE MIXED MATERIAL
Nct: THICKNESS OF NEGATIVE ELECTRODE COLLECTOR

Relationship Between Remaining Capacity SOC and Battery Temperature

When the self-heating rate of the lithium secondary battery at a temperature T (K) and a remaining capacity x (%) was represented by Hs(x,T) (K/min), and the heat dissipation rate of the lithium secondary battery at a temperature T (K) was represented by Hd(T) (K/min), the temperature Tbx (K) of the lithium secondary battery at which Hs(x,Tbx)>Hd (Tbx) holds was investigated. First, the temperature Tbx (K) was investigated when the remaining capacity SOC of the nonaqueous electrolyte lithium secondary battery thus formed was x %. In this example, with reference to a temperature at which the self-heating rate was higher than the heat dissipation rate, that is, with reference to the exothermic onset temperature of the lithium secondary battery, the temperature Tbx (K) was investigated, and the self-heating rate Hs(x,T) and the heat dissipation rate Hd (T) were indirectly considered. First, using the positive electrode mixed material, the differential scanning calorimetry (DSC) was performed, and the exothermic onset temperature was obtained. The DSC measurement was performed by ThermoPlus manufactured by Rigaku Corp. After the battery thus formed was adjusted so that remaining capacity SOC was one of 135%, 100%, 77.8%, and 50%, the positive electrode obtained by disassembling the battery was placed in a DSC pan, and after the electrolyte was added thereto, sealing was performed. This DSC pan was measured to 450° C. at a temperature rise rate of 5° C./rain, and the thermal behavior of the positive electrode and that of the electrolyte were checked. The measurement result of the remaining capacity SOC of the lithium secondary battery and the initial exothermic onset temperature of the DSC measurement are shown in Table 3. As shown in Table 3, it was found that the exothermic onset temperature increases with a decrease in remaining capacity, that is, it was found that the thermal stability is improved.

TABLE 3

| SOC | EXOTHERMIC ONSET TEMPERATURE |
| --- | --- |
| 135% | 140° C. |
| 100% | 145° C. |
| 77.8% | 180° C. |
| 50% | 230° C. |

Next, the relationship between the remaining capacity SOC and the temperature Tbx was investigated in detail. A temperature Tb100 (K) at which the remaining capacity of the nonaqueous electrolyte lithium secondary battery thus formed was 100% was investigated. As described above, since the exothermic onset temperature by DSC was 145° C. when the remaining capacity was 100%, it was estimated that the temperature Tb100 (K) was in the vicinity of this temperature. In this case, the battery heating test was performed in which after a lithium secondary battery at a remaining capacity of 100% was placed in an oven at a predetermined temperature, the temperature of an exterior wall of the battery can was measured, and the discharge voltage two hours after the battery was placed in the oven was also measured. Experimental Examples 1 to 7 were performed at oven temperatures of 130° C., 135° C., 138° C., 140° C., 145° C., 150° C., and 160° C., respectively. The measurement results are shown in Table 4. In the lithium secondary battery thus formed, when the remaining capacity SOC was 100%, it was found that Hs(x,Tbx)>Hd(Tbx) holds at a battery exterior wall temperature of 138° C., that is, it was found that the temperature Tb100 is 411K(=138+273).

TABLE 4

| SAMPLE | SOC | BATTERY VOLTAGE | OVEN TEMPERATURE | BATTERY EXTERIOR WALL TEMPERATURE | EVALUATION RESULT |
| --- | --- | --- | --- | --- | --- |
| EXAMPLE 1 | 100% | 4.1 V | 130° C. | 128° C. | GOOD |
| EXAMPLE 2 | 100% | 4.1 V | 135° C. | 133° C. | GOOD |
| EXAMPLE 3 | 100% | 4.1 V | 138° C. | 135.5° C. | GOOD |
| EXAMPLE 4 | 100% | 4.1 V | 140° C. | 138° C. | NOT GOOD |
| EXAMPLE 5 | 100% | 4.1 V | 145° C. | 143° C. | NOT GOOD |
| EXAMPLE 6 | 100% | 4.1 V | 150° C. | 147° C. | NOT GOOD |
| EXAMPLE 7 | 100% | 4.1 V | 160° C. | 157° C. | NOT GOOD |

Next, a temperature Tb77.8 (K) at which the remaining capacity of the nonaqueous electrolyte lithium secondary battery thus formed was 77.8% was investigated. As described above, since the exothermic onset temperature by DSC was 180° C. when the remaining capacity was 77.8%, it was estimated that the temperature Tb77.8 (K) was in the vicinity of this temperature. As was the case described above, Experimental Examples 8 to 12 were performed at oven temperatures of 145° C., 160° C., 170° C., 180° C., and 190° C., respectively. The measurement results are shown in Table 5. In the lithium secondary battery thus formed, when the remaining capacity SOC was 77.8%, it was found that Hs(x, Tbx)>Hd(Tbx) holds at a battery exterior wall temperature of 178° C., that is, it was found that the temperature Tb77.8 is 451K(=178+273).

TABLE 5

| SAMPLE | SOC | BATTERY VOLTAGE | OVEN TEMPERATURE | BATTERY EXTERIOR WALL TEMPERATURE | EVALUATION RESULT |
| --- | --- | --- | --- | --- | --- |
| EXAMPLE 8 | 77.8% | 3.88 V | 145° C. | 142° C. | GOOD |
| EXAMPLE 9 | 77.8% | 3.88 V | 160° C. | 157° C. | GOOD |
| EXAMPLE 10 | 77.8% | 3.88 V | 170° C. | 168° C. | GOOD |
| EXAMPLE 11 | 77.8% | 3.88 V | 180° C. | 178° C. | NOT GOOD |
| EXAMPLE 12 | 77.8% | 3.88 V | 190° C. | 187° C. | NOT GOOD |

Next, the change in remaining capacity from a remaining capacity of 100% at a temperature Tb100 to a remaining capacity of 77.8% at a temperature Tb77.8 was investigated. In this investigation, the case in which when the remaining capacity was 100%, the oven temperature was increased to 145° C., and the remaining capacity was then decreased from 100% to 77.8% was regarded as Experimental Example 13, and the case in which the remaining capacity was decreased from 100% to 60% was regarded as Experimental Example 14. The measurement results are shown in Table 6. When the remaining capacity was decreased from 100% to 77.8%, at a remaining capacity of 100%, the battery performance was degraded at 145° C.; however, since the temperature Tb77.8 was 178° C., the evaluation result was "Good", and it was found that the performance of the battery can be maintained. In the case of a remaining capacity of 60%, a similar result to that described above was also obtained. When the remaining capacity of the battery at a temperature Tb100=411K is 77.8%, since Hs(77.8,Tb100)<Hd(Tb100) holds, that is, since the heat dissipation rate exceeds the self-heating rate, the performance of the battery can be prevented from being degraded due to heat generation. That is, it was found that even if the temperature of the battery is not controlled, when the remaining capacity is controlled, the performance of the battery can be maintained.

TABLE 6

| SAMPLE | SOC | BATTERY VOLTAGE | OVEN TEMPERATURE | EVALUATION RESULT |
|---|---|---|---|---|
| EXAMPLE 13 | 100%→77.8% | 4.1 V→3.88 V | 145° C. | GOOD |
| EXAMPLE 14 | 100%→60% | 4.1 V→3.74 V | 145° C. | GOOD |

Next, the current value, the voltage application time, and the heat value were investigated when the remaining capacity was decreased concomitant with an increase of temperature of the battery. In this case, the relationship between the temperature and the rate of decreasing the remaining capacity of the battery from 100% to 77.8% after the battery exterior wall temperature reached 143° C. was investigated. The case in which the current was set to 1 A and the voltage application time was set to 600 seconds was regarded as Experiment Example 15, the case in which the current was set to 10 A and the voltage application time was set to 60 seconds was regarded as Experiment Example 16, the case in which the current was set to 20 A and the voltage application time was set to 30 seconds was regarded as Experiment example 17, and the case in which the current was set to 40 A and the voltage application time was set to 15 seconds was regarded as Experiment Example 18. The measurement results are shown in Table 7. In addition, the exothermic temperature (K) was obtained by the formula, $(R/1000) \times (I/1000)^2 \times t/C$, using the IV resistance R (mΩ), the current value I (mA), the voltage application time t (s), and the heat capacity C (J/K) of members other than the power generation element of the battery. Since Tb77.8−Tb100 was 40K(=451K−411K), Experimental example 18 was evaluated as "No Good" and Experimental examples 15 to 17 were evaluated as "Good". Therefore, when the remaining capacity is decreased from 100% to 77.8%, the control may be performed such that the current is set to 20 A or less, and the voltage application time is set to 30 seconds or more.

Next, the degree of the heat conduction of the electrode was investigated. In this case, when the amount of the positive electrode mixed material per one surface was represented by Pam (mg/cm$^2$), the two-sided thickness of the positive electrode mixed material was represented by Pat (μm), the thickness of the positive electrode collector was represented by Pct (μm), the amount of the negative electrode mixed material per one surface was represented by Nam (mg/cm$^2$), the two-sided thickness of the negative electrode mixed material was represented by Nat (μm), and the thickness of the negative electrode collector was represented by Nct (μm), the coefficient P and the coefficient N were investigated. The values of Experimental Examples 19 to 23 are shown in Table 8. By using these Experimental Examples 19 to 23, experiments were each performed such that after the battery exterior wall temperature of a battery at a remaining capacity of 100% reached 143° C., the time for starting a decrease in remaining capacity was changed. The current value was adjusted so the decrease in remaining capacity was completed within 30 seconds. The measurement results are shown in Table 9. From the results, it was found that when the battery structure satisfies 100<388.5×Pam×Pat/Pct$^2$<1000 and 30<13.7×Nam×Nat/Nct$^2$<1000, if the remaining capacity is adjusted within at least 10 minutes after the temperature reaches the temperature Tbx, the performance of the battery can be maintained.

TABLE 8

| SAMPLE | Pam mg/cm$^2$ | Pat μm | Pct μm | Nam mg/cm$^2$ | Nat μm | Nct μm |
|---|---|---|---|---|---|---|
| EXAMPLE 19 | 3.53 | 28 | 20 | 3.16 | 50 | 10 |
| EXAMPLE 20 | 8.82 | 70 | 20 | 5.26 | 88 | 10 |
| EXAMPLE 21 | 12.35 | 100 | 10 | 7.89 | 140 | 10 |
| EXAMPLE 22 | 20 | 150 | 10 | 12.63 | 220 | 8 |
| EXAMPLE 23 | 23.53 | 160 | 10 | 16.84 | 240 | 7 |

※ Pam: POSITIVE ELECTRODE MIXED MATERIAL PER ONE SURFACE
Pat: TWO-SIDED THICKNESS OF POSITIVE ELECTRODE MIXED MATERIAL
Pct: THICKNESS OF POSITIVE ELECTRODE COLLECTOR
Nam: NEGATIVE ELECTRODE MIXED MATERIAL PER ONE SURFACE
Nat: TWO-SIDED THICKNESS OF NEGATIVE ELECTRODE MIXED MATERIAL
Nct: THICKNESS OF NEGATIVE ELECTRODE COLLECTOR

TABLE 7

| SAMPLE | CURRENT VALUE | VOLTAGE APPLICATION TIME | BATTERY IV RESISTANCE | (R/1000)* (I/1000)$^2$*t/C. | EVALUATION RESULT |
|---|---|---|---|---|---|
| EXAMPLE 15 | 1 A | 600 s | 50 mΩ | 1 K | GOOD |
| EXAMPLE 16 | 10 A | 60 s | 40 mΩ | 9 K | GOOD |
| EXAMPLE 17 | 20 A | 30 s | 40 mΩ | 18 K | GOOD |
| EXAMPLE 18 | 40 A | 15 s | 50 mΩ | 45 K | NOT GOOD |

TABLE 9

| SAMPLE | P[1] | N[2] | STARTING TIME/min | | | | |
|---|---|---|---|---|---|---|---|
| | | | 5 | 10 | 30 | 60 | 90 |
| EXAMPLE 19 | 96 | 22 | GOOD | GOOD | GOOD | GOOD | GOOD |
| EXAMPLE 20 | 510 | 60 | GOOD | GOOD | NOT GOOD | NOT GOOD | NOT GOOD |
| EXAMPLE 21 | 4079 | 144 | GOOD | GOOD | NOT GOOD | NOT GOOD | NOT GOOD |
| EXAMPLE 22 | 9906 | 564 | GOOD | GOOD | NOT GOOD | NOT GOOD | NOT GOOD |
| EXAMPLE 23 | 12431 | 1072 | NOT GOOD | NOT GOOD | NOT GOOD | NOT GOOD | NOT GOOD |

[1] $P = 388.5 \times Pam \times Pat/Pct^2$
Pam: POSITIVE ELECTRODE MIXED MATERIAL PER ONE SURFACE
Pat: TWO-SIDED THICKNESS OF POSITIVE ELECTRODE MIXED MATERIAL
Pct: THICKNESS OF POSITIVE ELECTRODE COLLECTOR
[2] $N = 13.7 \times Nam \times Nat/Nct^2$
Nam: NEGATIVE ELECTRODE MIXED MATERIAL PER ONE SURFACE
Nat: TWO-SIDED THICKNESS OF NEGATIVE ELECTRODE MIXED MATERIAL
Nct: THICKNESS OF NEGATIVE ELECTRODE COLLECTOR As has thus been described, by using the relationship between the remaining capacity and the temperature Tbx (K) of the lithium secondary battery at which the self-heating rate Hs (x,Tbx)>the heat dissipation rate Hd(Tbx) holds, the control is performed to decrease the remaining capacity when the battery temperature T is increased, so that the performance of the lithium secondary battery can be maintained. In addition, when a temperature at which Hs(z,Tbz)>heat dissipation rate Hd(Tbz) holds at a target remaining capacity z (%) to be decreased is represented by Tbz (K), if the control is performed by a current value I and a voltage application time t which satisfy Tbz−Tbx (R/1000)×(I/1000)$^2$×t/C, the performance of the lithium secondary battery can be maintained. Furthermore, when 100<coefficient P<1000 and 30<coefficient N<1000 hold, if the control is performed to adjust the remaining capacity within at least 10 minutes after the temperature reaches the temperature Tbx, the performance of the lithium secondary battery can be maintained. In addition, the positive electrode collector is formed of Al foil, the negative electrode collector is formed of Cu foil, the coefficient P is represented by 388.5×Pam×Pat/Pct$^2$, and the coefficient N is represented by 13.7×Nam×Nat/Nce. By performing the control described above, it was found that the lithium secondary battery can be used in a more appropriate range in accordance with the change in temperature.

What is claimed is:

1. An electric power storage system comprising:
   a lithium secondary battery including:
   a positive electrode which has a positive electrode active material containing a metal oxide;
   a negative electrode containing a negative electrode active material; and
   an ion conductive medium which is provided between the positive electrode and the negative electrode and which conducts lithium ions;
   a detection unit to detect a temperature T of the lithium secondary battery; and
   a control unit programmed to decrease a remaining capacity of the lithium secondary battery based on a temperature Tbx (K) when the detected temperature T increases, the temperature Tbx (K) being a temperature of the lithium secondary battery at which Hs(x,Tbx)>Hd(Tbx) holds, where Hs(x,T) (K/min) indicates a self-heating rate of the lithium secondary battery at a temperature T (K) and a remaining capacity x (%), and Hd(T) (K/min) indicates a heat dissipation rate of the lithium secondary battery at the temperature T (K).

2. The electric power storage system according to claim 1, wherein in the lithium secondary battery, the metal oxide contains Ni.

3. The electric power storage system according to claim 1, wherein the control unit is programmed to decrease the remaining capacity of the lithium secondary battery when the detected temperature is 373K or more.

4. The electric power storage system according to claim 1, wherein the control unit has information of restriction relationship between the remaining capacity of the lithium secondary battery and the temperature Tbx thereof, and is programmed to obtain a remaining capacity corresponding to the temperature Tbx which corresponds to the detected temperature T of the lithium secondary battery by using the information of restriction relationship, and to decrease the remaining capacity of the lithium second battery in accordance with an increase of the detected temperature.

5. The electric power storage system according to claim 4, wherein the control unit has information of temperature increase relationship among a current value, a voltage application time, and an increase of temperature of the lithium secondary battery, and is programmed to decrease the remaining capacity of the lithium secondary battery in accordance with an increase of the detected temperature by a current value and a voltage application time within the range in which the temperature is not more than the temperature Tbx by using the information of temperature increase relationship.

6. The electric power storage system according to claim 1, wherein
   the temperature Tbx (K) is a temperature of the lithium secondary battery at which Hs(x,Tbx)>Hd(Tbx) holds, where Hs(x,T) (K/min) indicates the self-heating rate of the lithium secondary battery at a temperature T (K) and a remaining capacity x (%), and Hd(T) (K/min) indicates the heat dissipation rate of the lithium secondary battery at the temperature T (K), and
   the control unit is programmed to decrease the remaining capacity of the lithium secondary battery to a remaining capacity z (%) associated with the temperature Tbx so that Hs(z,Tbx)<Hd(Tbx) holds.

7. The electric power storage system according to claim 6, wherein the control unit is programmed to perform control by a current value I and a voltage application time t which satisfy Tbz−Tbx>(R/1000)×(I/1000)$^2$×t/C, where Tbz (K) indicates a temperature of the lithium secondary battery at the remaining capacity z at which Hs(z,Tbz)>Hd(Tbz) holds, R (mΩ) indicates an IV resistance of the lithium secondary battery, I (mA) indicates a current value, t (s) indicates a voltage application time from the remaining capacity x to the remaining capacity z, V indicates a voltage of the lithium secondary battery at the current value I after the voltage application time t, and C (J/K) indicates a heat capacity of a member other than a power generation element of the battery.

8. The electric power storage system according to claim 6, wherein
   the positive electrode has a collector of Al and the positive electrode active material provided on two surfaces of the collector,
   the negative electrode has a collector of Cu and the negative electrode active material of a carbon material provided on two surfaces of the collector, and
   the control unit is programmed to adjust the remaining capacity within at least 10 minutes after the temperature reaches the temperature Tbx, when $100<388.5\times Pam\times Pat/Pct^2<1000$ and $30<13.7\times Nam\times Nat/Nct^2<1000$ hold, where Pam (mg/cm$^2$), Pat (μm), Pct (μm), Nam (mg/cm$^2$), Nat (μm), and Nct (μm), respectively indicate an amount of a positive electrode mixed material per one surface, a two-sided thickness of the positive electrode mixed material, a thickness of the positive electrode collector, an amount of a negative electrode mixed material per one surface, a two-sided thickness of the negative electrode mixed material, and a thickness of the negative electrode collector.

* * * * *